(12) United States Patent
Barlow et al.

(10) Patent No.: US 7,069,417 B2
(45) Date of Patent: Jun. 27, 2006

(54) VECTOR PROCESSING SYSTEM

(75) Inventors: Stephen Barlow, Cambridge (GB); Neil Bailey, Cambridge (GB); Timothy Ramsdale, Cambridge (GB); David Plowman, Saffron Walden (GB); Robert Swann, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 564 days.

(21) Appl. No.: 10/284,301

(22) Filed: Oct. 31, 2002

(65) Prior Publication Data

US 2004/0088521 A1    May 6, 2004

(30) Foreign Application Priority Data

Oct. 31, 2002    (GB) .................................. 0126134.6

(51) Int. Cl.
*G06F 15/80*    (2006.01)
(52) U.S. Cl. ....................................................... 712/22
(58) Field of Classification Search ................... 712/22
See application file for complete search history.

(56) References Cited

U.S. PATENT DOCUMENTS

| 5,430,854 | A  |   | 7/1995 | Sprague et al. |
|-----------|----|---|--------|----------------|
| 6,343,356 | B1 | * | 1/2002 | Pechanek et al. ........... 712/210 |
| 6,366,999 | B1 | * | 4/2002 | Drabenstott et al. .......... 712/24 |
| 6,530,012 | B1 | * | 3/2003 | Wilson ........................ 712/22 |
| 6,839,728 | B1 | * | 1/2005 | Pitsianis et al. ............ 708/404 |

FOREIGN PATENT DOCUMENTS

| EP | 0 607 988 A1 | 7/1994 |
| GB | 2 201 015 A  | 8/1988 |

* cited by examiner

*Primary Examiner*—William M. Treat
(74) *Attorney, Agent, or Firm*—McAndrews, Held & Malloy (57) ABSTRACT

A vector processing system for executing vector instructions, each instruction defining multiple value pairs, an operation to be executed and a modifier, the vector processing system comprising a plurality of parallel processing units, each arranged to receive one of said pairs of values and, when selected, to implement an operation on said value pair to generate a result, each processing unit comprising at least one flag and being selectable in dependence on a condition defined by said at least one flag, wherein the modifier defines the condition under which the parallel processing unit is individually selected.

19 Claims, 5 Drawing Sheets

| Bit | Field |
|---|---|
| 32 | Rb_V / Immed(0) |
| 33 | Rb_USX / Immed(1) |
| 34 | Rb_XY(0) / Immed(2) |
| 35 | Rb_XY(1) / Immed(3) |
| 36 | Rb_XY(2) / Immed(4) |
| 37 | Rb_XY(3) / Immed(5) |
| 38 | Rb_X(4) / Cond(0) |
| 39 | Rb_X(5) / Cond(1) |
| 40 | Rb_Y(4) / Cond(2) |
| 41 | Rb_Y(5) / SETF |
| 42 | Rb_IMM |
| 43 | Ra_XY(0) |
| 44 | Ra_XY(1) |
| 45 | Ra_XY(2) |
| 46 | Ra_XY(3) |
| 47 | Ra_X(4) |

Half-word 2. Right column (bits 32–41) applies If Rb IMM = 1.

| Bit | Field |
|---|---|
| 16 | Ra_X(5) |
| 17 | Ra_Y(4) |
| 18 | Ra_Y(5) |
| 19 | Ra_USX |
| 20 | Ra_V |
| 21 | Rdab_SX(0) |
| 22 | Rdab_SX(1) |
| 23 | Rdab_SX(2) |
| 24 | Rd_XY(0) |
| 25 | Rd_XY(1) |
| 26 | Rd_XY(2) |
| 27 | Rd_XY(3) |
| 28 | Rd_X(4) |
| 29 | Rd_X(5) |
| 30 | Rd_Y(4) |
| 31 | Rd_Y(5) |

Half-word 1.

| Bit | Field |
|---|---|
| 0 | Rd_USX |
| 1 | Rdab_16BI |
| 2 | Rd_V |
| 3 | I(0) |
| 4 | I(1) |
| 5 | I(2) |
| 6 | I(3) |
| 7 | I(4) |
| 8 | I(5) |
| 9 | CMPT=1 |
| 10 | 0 |
| 11 | 0 |
| 12 | 0 |
| 13 | 0 |
| 14 | 0 |
| 15 | 0 |

Compact 48-bit Encoding, Half-word 0.

FIG. 5(I)

| | | | |
|---|---|---|---|
| 32 | Rb_V | Immed(0) | |
| 33 | Rb_CIRC | Immed(1) | |
| 34 | Rb_XY(0) | Immed(2) | |
| 35 | Rb_XY(1) | Immed(3) | If Rb_IMM = 1 or Rb_IMM2 = 1 |
| 36 | Rb_XY(2) | Immed(4) | |
| 37 | Rb_XY(3) | Immed(5) | |
| 38 | Rb_X(4) | Immed(6) | |
| 39 | Rb_X(5) | Immed(7) | |
| 40 | Rb_Y(4) | Immed(8) | |
| 41 | Rb_Y(5) | Immed(9) | |
| 42 | Rb_IMM | | |
| 43 | Ra_XY(0) | | |
| 44 | Ra_XY(1) | | |
| 45 | Ra_XY(2) | Ra_X(2) | If Ra_SP = 1 |
| 46 | Ra_XY(3) | Ra_X(3) | |
| 47 | Ra_X(4) | | |

Half-word 2

| | | | |
|---|---|---|---|
| 16 | Ra_X(5) | | |
| 17 | Ra_Y(4) | | |
| 18 | Ra_Y(5) | | |
| 19 | Ra_CIRC | | |
| 20 | Ra_V | SETF | If Ra_SP = 1 |
| 21 | Rd_SX(0) | | |
| 22 | Rd_SX(1) | | |
| 23 | Rd_SX(2) | | |
| 24 | Rd_XY(0) | | |
| 25 | Rd_XY(1) | | |
| 26 | Rd_XY(2) | | |
| 27 | Rd_XY(3) | | |
| 28 | Rd_X(4) | | |
| 29 | Rd_X(5) | | |
| 30 | Rd_Y(4) | | |
| 31 | Rd_Y(5) | | |

Half-word 1

| | |
|---|---|
| 0 | Rd_CIRC |
| 1 | Rd_16BIT |
| 2 | Rd_V |
| 3 | I(0) |
| 4 | I(1) |
| 5 | I(2) |
| 6 | I(3) |
| 7 | I(4) |
| 8 | I(5) |
| 9 | CMPT=0 |
| 10 | 0 |
| 11 | 0 |
| 12 | 0 |
| 13 | 0 |
| 14 | 0 |
| 15 | 0 |

Half-word 0

Full 80-bit Encoding

FIG. 5(II)

| Half-word 4 | 64 | SRU_SX(0) | |
| | 65 | SRU_SX(1) | |
| | 66 | SRU_SX(2) | |
| | 67 | SRU(0) | |
| | 68 | SRU(1) | |
| | 69 | Rep(0) | |
| | 70 | Rep(1) | |
| | 71 | Rep(2) | |
| | 72 | REPLT | |
| | 73 | ACC | |
| | 74 | CLRA | |
| | 75 | Cond(0) | |
| | 76 | Cond(1) | |
| | 77 | Cond(2) | |
| | 78 | SETF | |
| | 79 | - | |
| Half-word 3 | 48 | Rd_++ | |
| | 49 | Ra_SX(0) | |
| | 50 | Ra_SX(1) | |
| | 51 | Ra_SX(2) | |
| | 52 | Ra_x++ | |
| | 53 | Ra_Y(0) | |
| | 54 | Ra_Y(1) | |
| | 55 | Ra_y++ | Ra_Y(2) |
| | 56 | Ra_16BIT | Ra_Y(3) |
| | 57 | Ra_SP | |
| | 58 | Rb_++ | Immed(10) |
| | 59 | Rb_16BIT | Immed(11) |
| | 60 | Rb_SX(0) | Immed(12) |
| | 61 | Rb_SX(1) | Immed(13) |
| | 62 | Rb_SX(2) | Immed(14) |
| | 63 | Rb_IMM2 | Immed(15) |

If Ra_SP = 1
If Ra_IMM = 1
If Rb_IMM = 1 or Rb_IMM2 = 1
If Rb_IMM = 1

FIG. 5(III)

VECTOR PROCESSING SYSTEM

The present invention relates to a vector processing system and to a method of operating such and a computer program usable with the same.

It is increasingly the case that processors are being purpose built to fulfil the requirements of particular applications. The present invention concerns particularly, but not exclusively, a processor architecture for use in image processing or other multi-media applications.

Existing processor architectures use differing combinations of so-called scalar units and vector units. In the following, a scalar unit implies a unit capable of executing instructions defining a single operand set, that is, typically operating on a pair of source values and generating a destination value for each instruction. A vector unit operates in parallel on a plurality of value pairs to generate a plurality of results. These are often provided in the form of packed operands, that is two packed operands provide a plurality of value pairs, one from each operand in respective lanes.

Existing vector units are able to operate on a plurality of value pairs in parallel to generate a plurality of individual results, which are then stored for subsequent use. The aim of the present invention is to provide a vector processing system which has increased flexibility, in particular over the generation of results for particular lanes.

According to one aspect of the present invention there is provided a vector processing system for executing vector instructions, each instruction defining multiple value pairs, an operation to be executed and a modifier, the vector processing system comprising a plurality of parallel processing units, each arranged to receive one of said pairs of values and, when selected, to implement an operation on said value pair to generate a result, each processing unit comprising at least one flag and being selectable in dependence on a condition defined by said at least one flag, wherein the modifier defines the condition under which the parallel processing unit is individually selected.

Another aspect of the invention provides a method of executing a vector instruction in a vector processor, which comprises a plurality of parallel processing units, the method comprising: supplying to each parallel processing unit a pair of values on which an operation is to be implemented to generate a result; reading a modifier supplied with the instruction, the modifier defining a condition under which the parallel processing unit is individually selected; comparing the state of at least one flag in each processing unit with the defined condition to determine whether or not the processing unit is selected; processing the results of selected parallel processing units in a scalar result unit.

A further aspect of the invention provides a computer program comprising an instruction stream including vector instructions, each vector instruction defining multiple value pairs, an operation to be executed on each value pair and a modifier, the computer program being loadable into a processor which comprises a plurality of parallel processing units, each arranged to receive one of said value pairs and to selectively implement said operation, cooperation between the computer program and the processor being such that a parallel processing unit is selected to operate on the basis of a condition defined by at least one flag in the processing unit, the condition being set by the modifier in the vector instruction.

In a particularly preferred embodiment of the invention, the vector processing unit comprises a scalar result unit connected to process the results from selected processing units and to generate therefrom a scalar result.

In the embodiment which is described, the semantics of the vector instructions and scalar instructions are flexible enough that a vector instruction can define source values either in the vector unit, in the scalar unit or in a data memory.

Moreover, the vector unit can return its results either back to the vector unit itself (also packed operand) or to the scalar unit, as a scalar result.

Each vector instruction can identify two source packed operands, each operand containing a plurality of values in respective lanes. In the following, which describes a graphics processor, values are often referred to therein as pixels, because they represent the same. It is very useful to be able to determine which lanes are operated on in dependence on condition specified in an instruction, and for this to be handled in dedicated hardware, thereby obviating the need for software comparisons.

For a better understanding of the present invention, and to show how the same may be carried into effect, reference will now be made by way of example to the accompanying drawings, in which.

Figure 1:
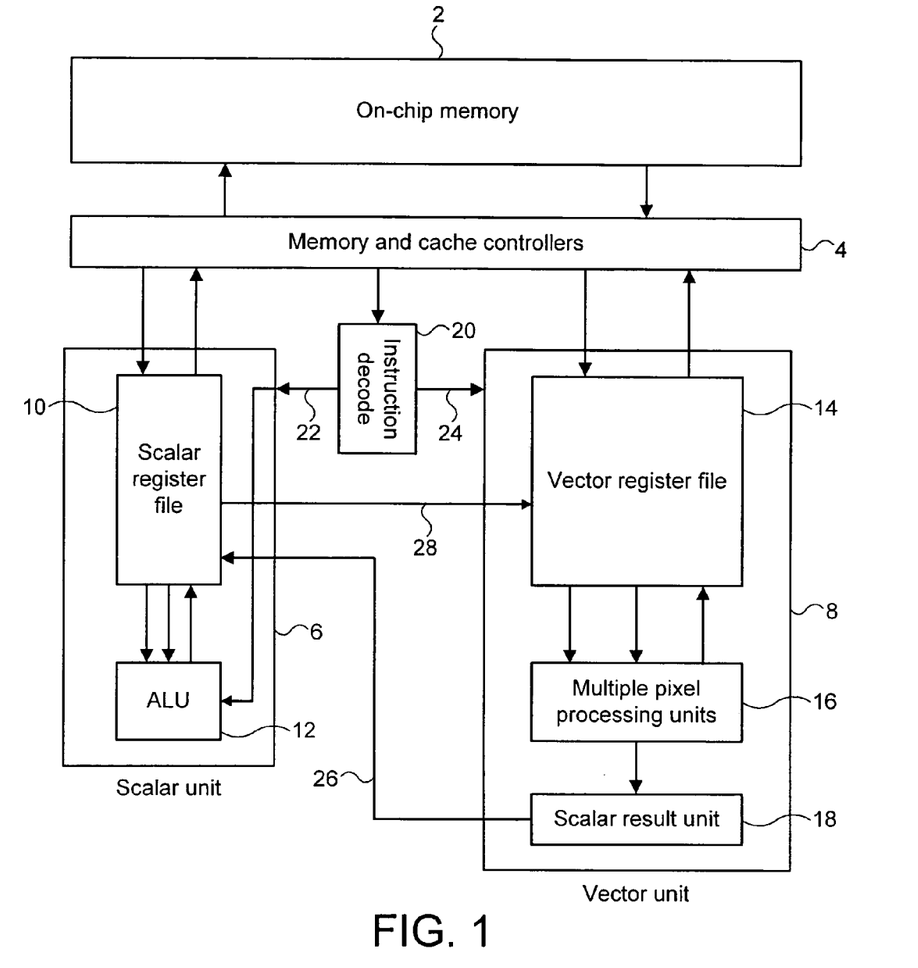
FIG. 1 is a schematic block diagram of the processor architecture.

FIG. 1 is a schematic block diagram of a processor in accordance with one embodiment of the invention. An on-chip memory 2 holds instructions and data for operation of the processor. Memory and cache controllers denoted generally by a block 4 control communication of instructions and data from the on-chip memory with the two main processing units of the processor. The first main processing unit 6 is a scalar unit and the second main processing unit 8 is a vector unit. The construction and operation of these units will be described in more detail in the following. In brief, the scalar unit 6 comprises a scalar register file 10 and an ALU processing block 12. The vector unit 8 comprises a vector register file 14, a plurality of pixel processing units (PPU) denoted generally by a block 16 and scalar result unit 18. An instruction decoder 20 receives a stream of instructions from the on-chip memory 2 via the memory and cache controllers 4. As will be discussed in more detail hereinafter, the instruction stream comprises distinct scalar and vector instructions which are sorted by the instruction decoder 20 and supplied along respective instruction paths 22, 24 to the scalar unit and to the vector unit depending on the instruction encoding. The results generated by the vector unit, in particular in the scalar result unit 18, are available to the scalar register file as denoted by arrow 26. The contents of the scalar register file are available to the vector register file as indicated diagrammatically by arrow 28. The mechanism by which this takes place is discussed later.

FIG. 1 is a schematic view only, as will be apparent from the more detailed discussion which follows. In particular, the processor includes an instruction cache and a data cache which are not shown in FIG. 1 but which are shown in subsequent figures.

Before discussing the detail of the processor architecture, the principles by which it operates will be explained.

The scalar and vector units 6, 8 share a single instruction space with distinct scalar and vector instruction encodings. This allows both units to share a single instruction pipeline, effectively residing in the instruction decoder 20 (implemented as a control and instruction decode module). Instructions are dispatched sequentially to either the scalar unit 6 or to the vector unit 8, depending on their encodings, where they run to completion as single atomic units. That is, the control and instruction decode module 20 waits for the previous instruction to complete before issuing a new instruction, even if the relevant unit is available to execute the new instruction.

The scalar unit 6 and vector unit 8 operate independently. However, communication between the two units is available because of the following two facets of the processor architecture. Both units can read and write data in the main on-chip memory 2. In addition, the vector unit can use registers in the register file 10, immediate values (fixed values defined in an instruction) and main memory accesses using values held in the scalar register file 10. The result of a vector operation in the vector unit 8 can then be written back into one of these scalar registers from the scalar result unit 18.

The scalar unit is not germane to the present invention and will not be discussed further herein in any detail. Suffice it to say it receives scalar results from the vector unit and can store and process such results by using its scalar register file. It is noted that one of the registers in the scalar register file 10 constitutes the program counter which points to the address of the current instruction and thus is used to control instruction fetches. The scalar instruction set uses a standard encoding of 16 bits, with 32 bit and 48 bit variants to cater for large immediate and offset values.

As a practical matter, the instruction decode unit 20 decodes the incoming instruction and sets a large number of control lines according to the instruction received. These control lines spread throughout the rest of the chip. Some of them feed into the scalar unit (some (23) to the scalar register file, some (25) to the scalar ALU). These lines are used when the instruction received was a scalar one.

Other lines feed into the vector unit 8 along path 24. These are distributed so that some lines feed to the vector register file 14, some to the PPUs 16 and so forth. These are used when the instruction was a vector one. In the case of the PPUs, there are six control lines feeding identically from the instruction decode unit 20 into each of the 16 PPUs. In fact, these lines are set directly from the "opcode bits" in the vector instruction (discussed later).

Each PPU will individually examine these six control lines and perform a singly operation on its inputs according to the current setting. Each of the 64 possible settings represents a singley specific instruction (though not all are currently used). A similar arrangement exists for the scalar ALU. When a scalar instruction is received, the instruction decode unit finds the correct "opcode bits" in the instruction and passes them along the control lines that run to the scalar ALU.

Figure 2:
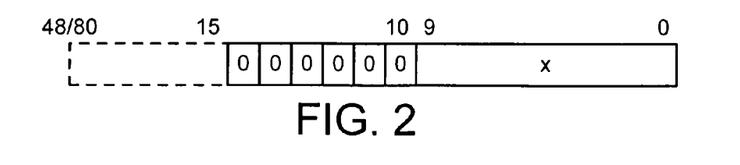
FIG. 2 illustrates bits 0 to 15 of a vector instruction.

FIG. 2 illustrates bits 0 to 16 of a vector instruction. Of particular importance, it is to be noted that the 6 bit sequence 000000 in bits 10 to 15 of the instruction indicate that the instruction is not a scalar instruction but is in fact a vector instruction. This allows the instruction decoder 20 to distinguish between scalar instructions and vector instructions. Vector instructions are described in more detail later.

The vector unit 8 comprises sixteen 16 bit pixel processing units $PPU_0 \ldots PPU_{15}$ which operate in parallel on two sets of sixteen values. These sets of values can be retrieved as packed operands from the vector register file 14, from the scalar register file 10 or from the main memory 2. The results of the PPU operations are handled as described later.

The detail of the vector register file 14 is not germane to the present invention and therefore is not described in detail herein. However, it is to be noted that groups of sixteen contiguous pixels are written or read at once, each pixel value being represented optionally by an 8-bit or 16-bit sequence.

Figure 3:
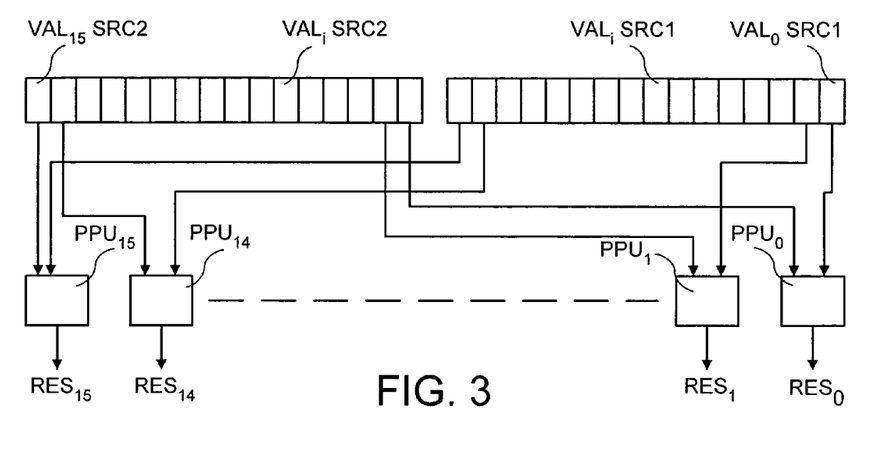
FIG. 3 is a schematic diagram illustrating parallel operation of multiple pixel processing units in the vector unit.

As illustrated in FIG. 3, each pixel processing unit PPUi acts on two values. When the processor is a graphics processor, each value relates to a pixel. The vector instructions supply two operands to the pixel processing unit. These are labelled SRC1, denoting a first packed operand and SRC2, denoting a second packed operand in FIG. 3. Each operand comprises a plurality of values, in the described embodiment sixteen 16-bit values. A value from each operand is supplied to each pixel processing unit 16, such that PPUi operates on the ith element of the 16 element factors (operands) that have been processed simultaneously. An individual result is generated by each pixel processing unit, the result being labelled RESi in FIG. 3. A PPU can be selected or not selected depending on the states of internal flags 56 discussed later and a condition specified in a vector instruction.

The pixel processing units $PPU_0 \ldots PPU_{15}$ will now be described with reference to FIG. 4. Each of the pixel processing units contains an ALU 50 which operates on two input 16-bit values VAL; SRC1, VAL; SRC2 supplied along two of three input paths 52, 53, 54 depending on their origin, to port MEM, to port A and port Op2 to create a single output value RESi, according to the operation that has been selected by the vector instruction. A multiplexer 57 selects two of the three input paths. Each pixel processing unit 16 has Z. N and C flags denoted generally by the flag block 56. The Z flag denotes a zero flag, the N flag denotes a negative flag and the C flag is a carry flag. The state of these flags can be used to define a condition which can be compared with a condition defined in a vector instruction to select or deselect an individual PPU. Each pixel processing unit includes an adder 58 and an accumulator 59, which allow the result of the ALU operation to be accumulated and then returned. The thus accumulated value is denoted $V_{acc}$. The output of each pixel processing unit 16 is supplied at port D to the vector register file and to the scalar result unit 18. It will be clear from this that a vector instruction can have two "destinations", one being the VRF where PPU results are returned and the other being the SRF where the result of the SRU operation is returned. In particular, the values that emerge from the PPUs are in essence always fed both back to the VRF and the SRU. There are just a few qualifications, including the possibility that the destination register of a vector instruction my be given as "-" meaning "do not write the result back". In this case, no values are returned to the VRF. The values are still passed on to the SRU as usual, however.

Each pixel processing unit PPUi also includes three AND gates 70, 72, 74. These AND gates receive accumulate ACC and clear CLRA inputs respectively, the function of which is described in more detail later. These inputs are derived from modifiers contained in the vector instructions. Other instruction modifiers IFxx, SETF, are supplied to flag block 56 along paths 76, 78 respectively. Once again, the function of these modifiers will be discussed later.

The scalar result unit 18 operates on the outputs of the selected pixel processing units 16, that is those selected where the condition defined by the flags matches the condition defined in the instruction, depending on the operation defined in the vector instruction supplied to the vector unit. This value is then written back to the scalar register file 10 in the scalar unit 6 and the scalar flags N, Z are updated according to it.

Values can be supplied to the pixel processing units 16 in a number of different ways. The use of a 12 bit index from the SRF 10 creates an address into the vector register file. This causes data held in the vector register file to be supplied to the pixel processing units 16 into port A along path 52. Data for port Op2 can also be accessed from the vector register file using an index from the SRF 10 which has created an address.

An alternative supply of data to the pixel processing unit 16 is directly from onchip memory 2. Such data is supplied to port MEM of the pixel processing unit.

Figure 4:
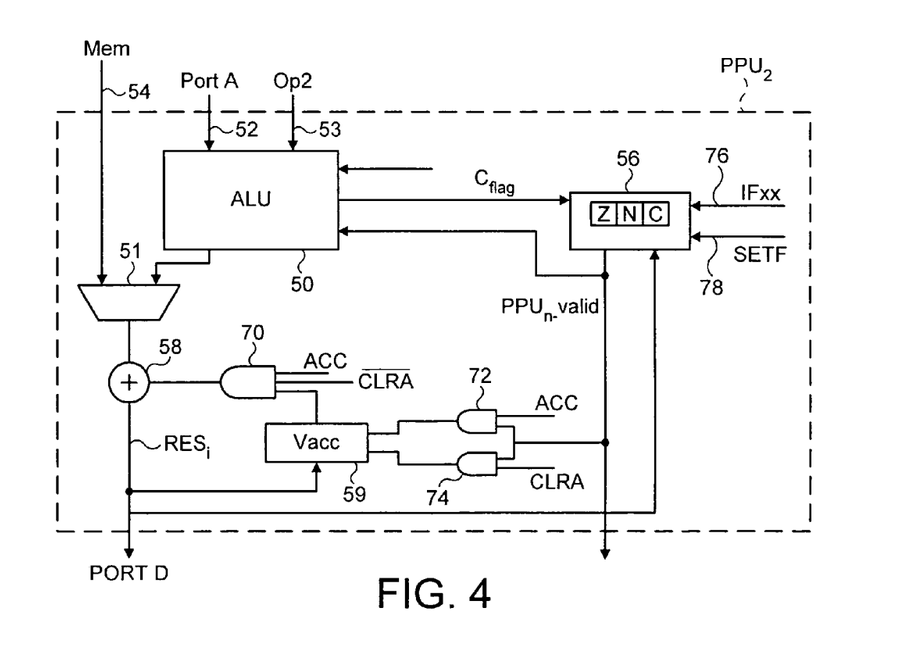
FIG. 4 is a schematic diagram illustrating the internal circuitry of pixel processing units.

From this discussion it will be appreciated that the input labelled 54 in FIG. 4 to the pixel processing units can supply either values from the vector register file, values from the scalar register file or values directly from memory to the ALU.

With a small number of exceptions, almost all vector instructions have a general three operand form:

<operation>R(yd,xd), R(ya,xa), Op2 [<modifiers>]

where operation is the name of the operation to be performed, and registers in the vector register file are generically denoted R(y,x) due to the addressing semantics of the vector register file (not discussed herein). In the above example R(yd,xd) is the destination register, R(ya,xa) is the first source register and Op2 may indicate a second source register R(yb,xb), or a value taken from one of the scalar registers of the SRF 10 or an immediate value (these latter two being repeated identically across all sixteen PPUs), as explained above. Finally <modifiers> are selected from an optional list of instruction modifiers which control how the PPUs 16 and the scalar result unit handle the results of the ALU operations in each PPU. The invention is particularly concerned with the set of flag modifiers, but the following description also discusses a modifier which affects the PPUs and modifiers which affect the scalar result unit.

As mentioned above, each pixel processing unit has a plurality of flags Z, N, C in block 59, which are settable and the state of which can be used to selectively control operation of the individual processing unit. The PPU flag modifiers exist in various of the vector instructions. The set of PPU flag modifiers is illustrated in Table 1 below.

TABLE I

| Modifier | Description |
| --- | --- |
| SETF | Update the PPU flags at the end of the operation |
| IFZ | Execute only if Z (zero) flag set |
| IFNZ | Execute only if Z flag not set |
| IFN | Execute only if N (negative) flag set |
| IFNN | Execute only if N flag not set |
| IFC | Execute only if C (carry) flag set |
| IFNC | Execute only if C flag not set |

IFXX

The term IFXX is used to refer collectively to all the modifiers above except SET F. The pixel processing unit 16 only performs the operation if the given condition, according to Table 1, is met. If the condition is not met, then the pixel processing unit is turned off. The ALU operation is not performed in that pixel processing unit, no saturation is performed, no accumulation takes place and no flags are changed in that pixel processing unit. Nor is the final pixel processing unit result written back to the destination register, the value formerly there being left unchanged.

SETF

If specified, the "Set Flag" modifier SETF causes each pixel processing unit 16 to update its flags at the end of the operation. The Z, N and C flags are updated according to the following rules:

The C flag is updated by the ALU operation and saturation unit.

The Z and N flags are set according to the final result of the pixel processing unit operation. This will be the output of the ALU if the accumulate modifier ACC was not present, or the accumulated value if it was.

The SETF and IFXX modifiers may be specified together. The set flags modifier SETF will only set the flags in those pixel processing units that match the IFXX condition.

Another modifier affecting the PPU is the "accumulate" modifier ACC. This modifier instructs the pixel processing unit 16 to add the result of the ALU operation to the current value of the accumulator 59. This addition is always performed using 16 bit signed saturating arithmetic. When the "accumulate" modifier ACC is specified, then the accumulated value, not the output of the ALU, becomes the final output read by the pixel processing unit. This means that the accumulated value will be written back to the destination register at port D.

The "clear accumulator" modifier CLRA instructs the pixel processing unit to set the accumulator value to zero at the start of the instruction.

The vector instructions operate on the pixel processing unit 16 in the following way.

Each of the sixteen pixel processing units is presented with two 16-bit values, one derived from R(ya,xa) and one derived from Op2. (Note that if 8-bit values are read from the vector register file then these are zero extended into 16-bit values.)

Each selected pixel processing unit performs its operation in accordance with the nature of the operation defined in the instruction. The operation is executed by the ALU 50. If an instruction modifier specifies accumulation of the results, then this takes place. In this case the accumulated values are returned as the final output values of the pixel processing units 16, otherwise the output of the ALU operation is returned as the final output of the pixel processing unit. The scalar result unit 18 performs any calculations indicated by modifiers. The scalar result unit operates on the final outputs from selected pixel processing units 16 and the result may be written to one of the scalar registers of the SRF 10 and the scalar flags will be set accordingly. The final outputs of the pixel processing units are also written back to the vector register file at port D.

The vector instruction set can be thought of as being constituted by four types of instructions:
   load/store instructions
   move instruction
   data processing instructions
   look up instructions.

Figure 5:
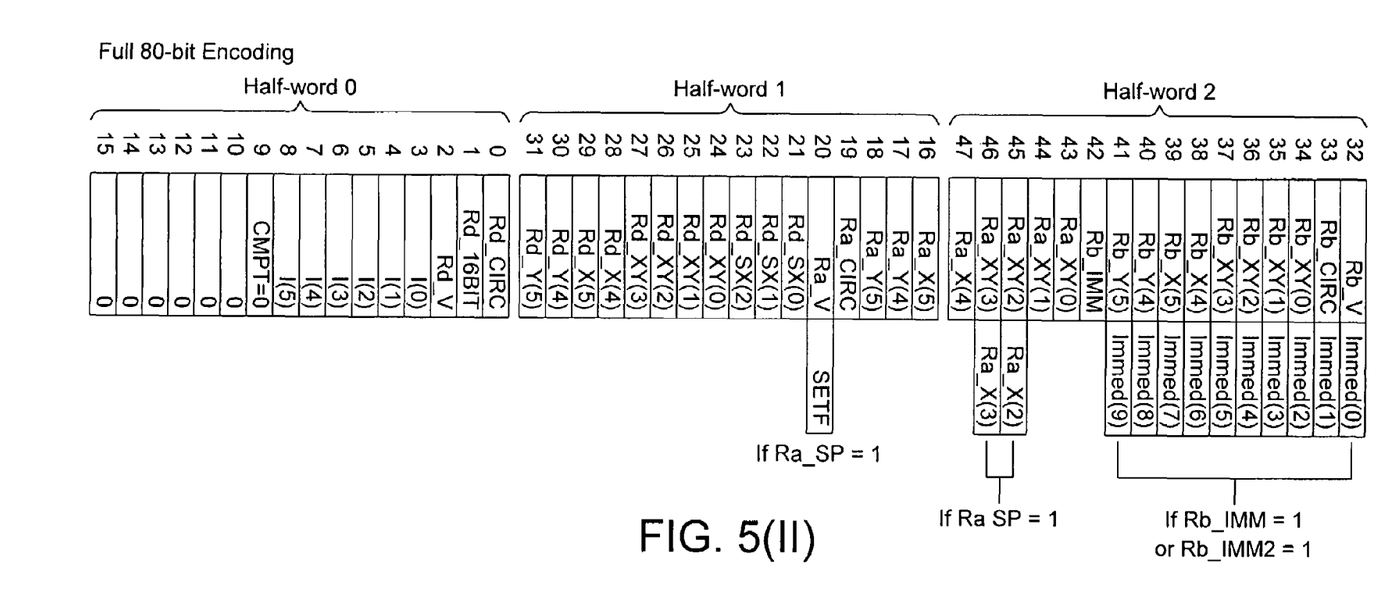
FIG. 5 illustrates 48 bit and 80-bit encodings of vector instruction.
Figure 5I:
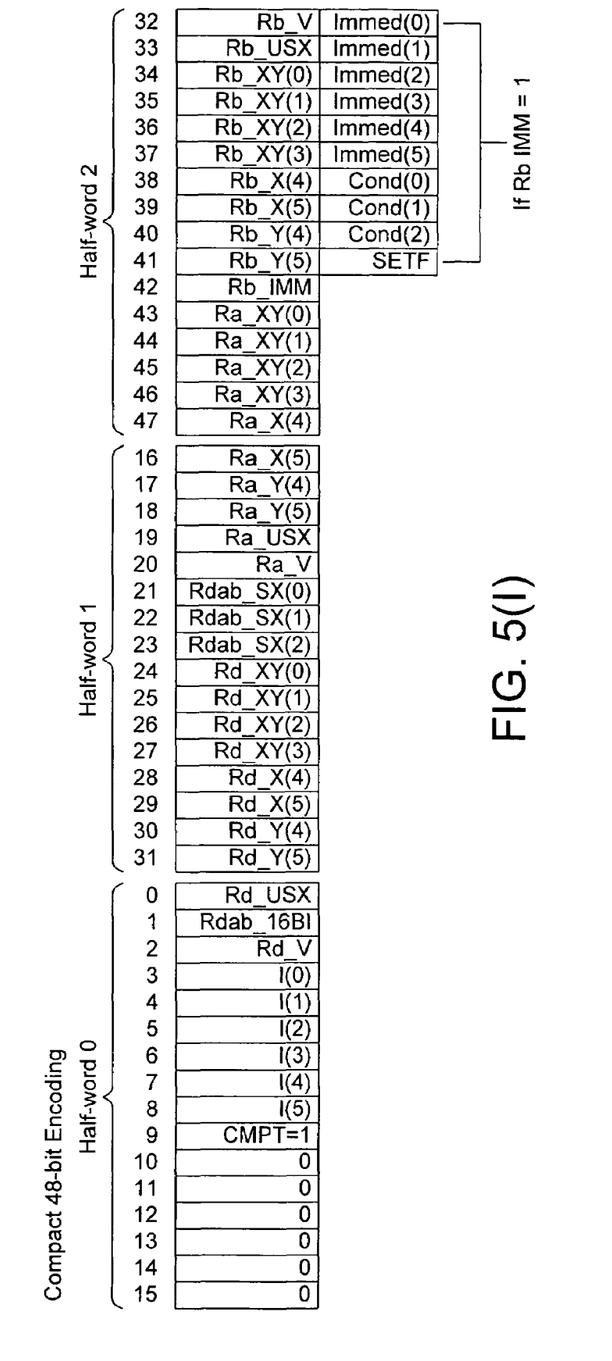

It is to be noted that in writing the program, all vector instructions are preceded by v to denote that they are vector instructions. In the encoding, bits 10 to 15 are set to zero so that the fact that they are vector instructions can be recognised by the instruction decoder. Each instruction type has an 80-bit full encoding, and a compact 48-bit encoding. By way of example, FIG. 5 illustrates the compact 48-bit encoding and full 80-bit encodings for data processing instructions of the following form:

<operation>R(yd,xd),R(ya,xa),Op2.

Note that all instructions contain six bits to hold opcode identifying the nature of the instruction (BITS 3 TO 8 OF half-Word 0, labelled I[0] to I[5]. These bits are supplied to each of the PPUs 16. Also note that bit 9 labelled CMPT is a flag which is set to one to indicate a compact 48-bit encoding and zero to indicate the full 80-bit encoding. In the 80-bit encoding, the modifier bits are in Half-Word 4, labelled SETF, Cond [2] . . . SRU_SX[0], the last three bits indicating which scalar register is the destination for the SRU. In the 48-bit encoding, SETF and Cond bits are in bits 38 to 41 of Half-Word 2.

The main categories of vector instructions are discussed below.

Load/store Instructions

Vld R(yd,xd), (rx+#immediate)

Load sixteen consecutive bytes or sixteen bit half words from memory into the vector register file.

The load instructions identify a destination register in the vector register file and identify a source operand by virtue of its address in main memory. Its address in main memory is calculated from the content of a register rx in the scalar register file 10 using the address calculation logic $64_B$ and the resulting operand is supplied to port MEM.

The store instructions identify a set of operands in the vector register file and cause them to be stored back to memory at an address identified using the contents of a scalar register. The instruction has the following format:

Vst R(ya,xa), (rx+#immediate).

Store sixteen consecutive bytes or half words from the VRF back to memory. The memory address is calculated using the address calculation logic $64_B$ as before.

In both cases, if R(y,x) denotes an 8-bit register, sixteen bytes are stored. If R(y,x) denotes a 16-bit register, half words are stored.

Move Instructions vmov R(yd,xd), Op2 moves OP2 to R(yd,xd).

In this case, Op2 may be a value from a scalar Register rx, or an immediate value or an immediate value plus the value from a scalar register rx, or a VRF register R(yb,xb). In this case therefore there are a number of options for identifying the location of the source value, the destination location being identified in the vector register file.

Data Processing Instructions

All these instructions take the usual form:

<operation>R(yd,xd) R(ya,xa) Op2.

A number of different operations can be specified, including addition, subtraction, maximum, minimum, multiply, etc.

Look-up instructions are specialised instructions having the form:

vlookup R (yd,xd)

and are not discussed further herein. They allow access to the vector register file, the addressing semantics of which are not discussed further herein.

As mentioned above, the scalar result unit 18 can implement different operations as defined by modifiers in the vector instructions.

The SRU 18 calculates a 32-bit value from the 16 PPU outputs and writes this result back to one of the scalar registers in the SRF 10 denoted by rx. The scalar unit N and Z flags are both updated by this process, with the C and V flags left unaffected. The modifiers that apply to the SRU are given in Table II.

TABLE II

| Modifier | Description |
|---|---|
| PPU0 rx | Place the output of $PPU_0$ into register rx |
| SUM rx | Sum all PPU outputs and place the result in rx |
| IMIN rx | Place the index (0..15) of the minimum PPU output in rx |
| IMAX rx | Place the index (0..15) of the maximum PPU output in rx |

PPU0 The output of the first PPU ($PPU_0$) is placed into scalar register rx, and the scalar flags updated accordingly. If, by virtue of conditional execution, $PPU_0$ is not operating, then the result is always zero.

SUM

All selected PPUs are summed and the result placed in rx, updating the scalar flags accordingly. If no PPUs are selected, then the result is always zero.

IMIN

The index i (running from 0 to 15) of PPUI that contains the minimum value of any selected PPUs is placed in rx, and the scalar flags updated. If no PPUs are selected, then the result is −1. If two or more PPUs share the same minimum, the lowest valued index is returned.

IMAX

The index i of $PPU_i$ that contains the maximum value of any selected PPUs is placed in rx, and the scalar flags updated. If no PPUs are selected, then the result is −1. If two or more PPUs share the same maximum, the highest valued index is returned.

None of these SRU modifiers can be mixed with one another.

The invention claimed is:

1. A vector processing system comprising:
a circuit for receiving an instruction defining multiple value pairs, an operation to be executed and a modifier;
a plurality of parallel processing units, each arranged to receive one of said value pairs and, when selected, to implement the operation on said value pair to generate a result, each processing unit in the plurality of parallel processing units comprising at least one flag and being selectable in dependence on a condition defined by said at least one flag and the modifier; and
a scalar processing unit for receiving the results from more than one selected processing unit to generate a scalar result.

2. The vector processing system according to claim 1, wherein said at least one flag is a carry flag.

3. The vector processing system according to claim 1, wherein said at least one flag is a negative flag.

4. The vector processing system according to claim 1, wherein said at least one flag is a zero flag.

5. The vector processing system according to claim 1, wherein a parallel processing unit in the plurality of parallel processing units comprises a plurality of flags, the condition being defined by the state of said plurality of flags.

6. The vector processing system according to claim 1, wherein the modifier in the instruction is a set flag modifier for updating the at least one flag in the plurality of parallel processing units.

7. The vector processing system according to claim 1, wherein the system further comprises a vector register file holding packed operands, each operand comprising multiple values.

8. The vector processing system according to claim 1, wherein a parallel processing unit in the plurality of parallel processing units comprises an accumulator that is selectively operable to accumulate the result of the parallel processing unit.

9. The vector processing system according to claim 8, wherein the modifier of the instruction is an accumulate modifier that causes the accumulator to accumulate the results of successive operations of the parallel processing unit.

10. A method of vector processing, the method comprising:
   supplying to a first parallel processing unit a first pair of values on which an operation is to be implemented to generate a first result, wherein the first parallel processing unit is one of a plurality of parallel processing units;
   reading a modifier supplied with an instruction, the modifier defining a condition under which the first parallel processing unit is selected;
   comparing a state of at least one flag in the first parallel processing unit with the defined condition to determine whether or not the first parallel processing unit is selected; and
   if the first parallel processing unit is selected,
      executing the operation to generate the first result;
   supplying to a second parallel processing unit a second pair of values on which the operation is to be implemented to generate a second result, wherein the second parallel processing unit is another of the plurality of parallel processing units;
   reading the modifier supplied with the instruction, the modifier defining a condition under which the second parallel processing unit is selected;
   comparing a state of at least one flag in the second parallel processing unit with the defined condition to determine whether or not the second parallel processing unit is selected; and
   if the second parallel processing unit is selected,
      executing the operation to generate the second result, and processing the first result and the second result in a scalar result unit to produce a scalar result.

11. An integrated circuit for vector processing, wherein the integrated circuit comprises:
   a memory having stored thereon a computer program comprising an instruction stream including a vector instructions, the vector instruction defining
      multiple value pairs,
      an operation to be executed on each value pair, and
      a modifier; and
   a processor which comprises a plurality of parallel processing units, wherein each parallel processing unit is arranged to receive one of said value pairs and to selectively implement said operation, and wherein cooperation between the computer program and the processor being such that a parallel processing unit is selected to operate on the basis of a condition defined by at least one flag in the processor, and wherein the condition is set by the modifier in the vector instruction, and wherein more than one results from the plurality of parallel processing units is processed to generate a scalar result.

12. The integrated circuit according to claim 11, wherein said at least one flag is a carry flag.

13. The integrated circuit according to claim 11, wherein said at least one flag is a negative flag.

14. The integrated circuit according to claim 11, wherein said at least one flag is a zero flag.

15. The integrated circuit according to claim 11, wherein each parallel processing unit in the plurality of parallel processing units comprises a plurality of flags, the condition being defined by the state of said plurality of flags.

16. The integrated circuit according to claim 11, wherein the modifier in the vector instruction is a set flag modifier for updating the at least one flag in the plurality of parallel processing units.

17. The integrated circuit according to claim 11, wherein the memory further stores a vector register file holding packed operands, each operand comprising multiple values.

18. The integrated circuit according to claim 11, wherein each parallel processing unit in the plurality of parallel processing units comprises an accumulator that is selectively operable to accumulate the result of the parallel processing unit.

19. The integrated circuit according to claim 11, wherein the modifier of the vector instruction is an accumulate modifier that causes the accumulator to accumulate the results of successive operations of the parallel processing unit.

* * * * *